US006337854B1

(12) United States Patent
Papini et al.

(10) Patent No.: US 6,337,854 B1
(45) Date of Patent: Jan. 8, 2002

(54) METHOD OF SECURING COMMUNICATION BETWEEN TWO MOBILES AND ASSOCIATED TRANSMITTER

(75) Inventors: Hélène Papini, Orsay; François Simon, La Norville, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/225,780

(22) Filed: Jan. 5, 1999

(30) Foreign Application Priority Data

Jan. 6, 1998 (FR) .............................................. 98 00031

(51) Int. Cl.$^7$ .............................. H04J 3/00; H04Q 7/00; H04L 27/30; A61F 2/06
(52) U.S. Cl. ....................... 370/345; 370/314; 370/349; 370/350; 370/280; 375/130; 375/133; 375/136
(58) Field of Search .................... 370/345, 310, 370/314, 350, 280, 349, 515, 521; 375/130, 220, 133, 202, 354, 356

(56) References Cited

U.S. PATENT DOCUMENTS

| 4,267,592 A | * | 5/1981 | Craiglow ..................... 370/29 |
| 4,829,540 A | * | 5/1989 | Waggener, Sr. et al. ........ 375/1 |
| 5,189,411 A | * | 2/1993 | Collar et al. ........... 340/825.14 |
| 5,361,277 A | * | 11/1994 | Grover ....................... 375/107 |
| 5,712,867 A | * | 1/1998 | Yokev et al. ................ 375/202 |
| 5,764,275 A | * | 6/1998 | Lappington et al. .......... 348/12 |
| 5,859,595 A | * | 1/1999 | Yost ....................... 340/825.44 |

FOREIGN PATENT DOCUMENTS

| DE | 30 43 461 A1 | 7/1982 |
| DE | 195 01 994 A1 | 7/1996 |
| FR | 2 607 769 A1 | 6/1988 |
| WO | WO 93/06662 | 4/1993 |
| WO | WO 96/27822 | 9/1996 |

OTHER PUBLICATIONS

F. van den Dool, "Synchronization Aspects of ATD–1BC Networks", Innovations in Switching Technology, Phoenix, Arizona, Mar. 15–20, 1987, vol. part 4, No. Symp. 1987, Mar. 15, 1987, pp. B12.1.1–B12.1.5, XP000670368 Institute of Electrical and Electronics Engineers.#jf139##

*Primary Examiner*—Wellington Chin
*Assistant Examiner*—M. Phan
(74) *Attorney, Agent, or Firm*—Sughrue Mion, PLLC

(57) ABSTRACT

A method of transmitting an initial message between two radiocommunication stations, possibly mobile stations, in which a first radiocommunication station: inserts a time supplied by a clock in the initial message to form an outgoing message, and transmits the outgoing message and the successive times supplied by the clock to the second radiocommunication station. Applications include railroad radiocommunication networks.

4 Claims, 1 Drawing Sheet

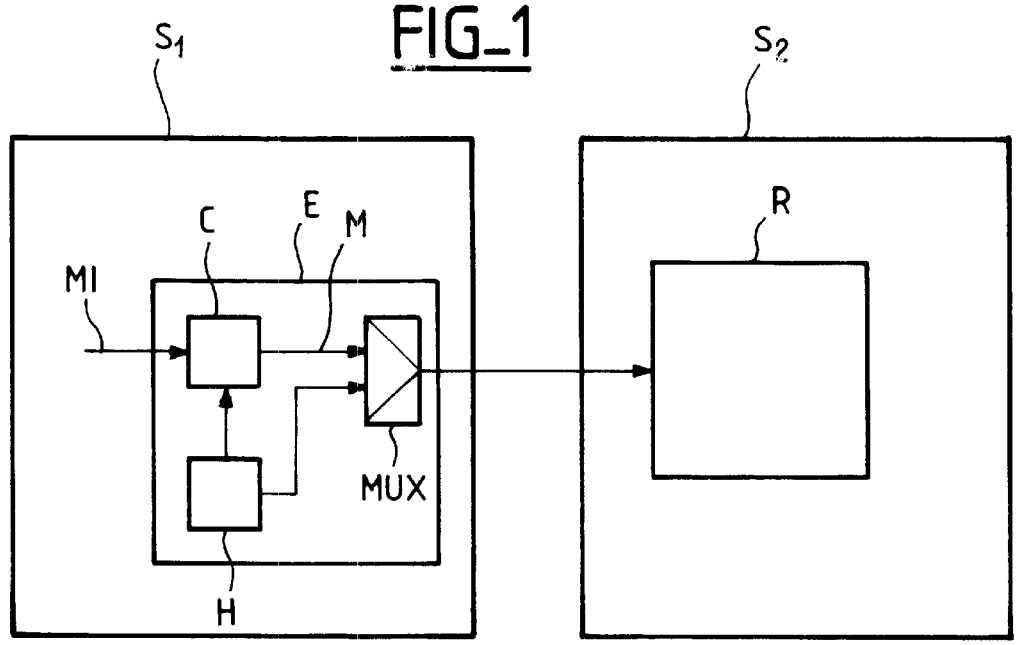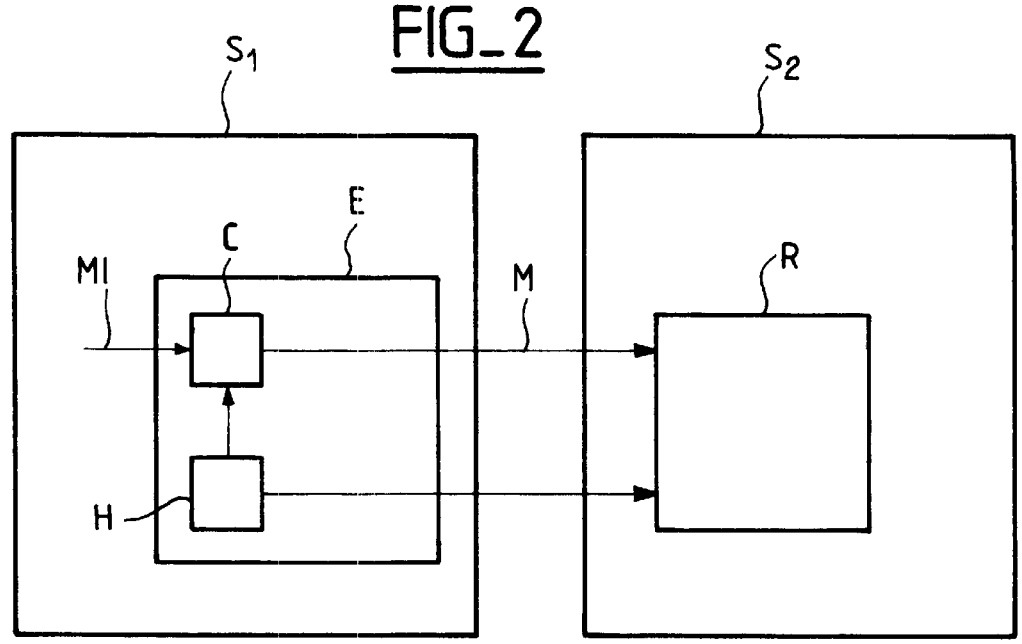

METHOD OF SECURING COMMUNICATION BETWEEN TWO MOBILES AND ASSOCIATED TRANSMITTER

BACKGROUND OF THE INVENTION

1. Field of the Invention

The present invention concerns a method of securing the time reference of a message transmitted in a radiocommunication network, in particular between two mobile stations or between a mobile station and a fixed station. More particularly, the invention finds an application in radiocommunication networks requiring a high level of security, such as railroad radiocommunication networks.

2. Description of the Prior Art

Railroad radiocommunication networks are used to exchange information between two nearby trains (passing each other for example) or between a train and a ground station.

Information can pass between a train and a ground station in both directions:

- from the train to the ground station in the case of instructions transmitted by the train to the railroad network (remote control of a switch, for example), and
- from the ground station to the train in the case of information on the status of the railroad network and in particular on exceptional events such as a section of the network being out of service.

The above possibilities do not constitute a comprehensive statement of the types of information that can be transmitted on this type of network.

Nevertheless, these few examples show clearly that messages transmitted on the network require an extremely high level of security. For example, if a section of the track is closed because of the unscheduled stopping of another train, an error in transmitting the message to the next train can lead to a fatal accident.

Transmission errors that can occur on a radiocommunication network can be classified into two different types: errors in the content of the message and errors in the time reference.

The problem of errors in the content of a message transmitted on a communication channel of any kind is a well-known problem to which there are many solutions, in particular based on error-correcting encoding techniques.

The time reference problem occurs as soon as the pertinence of messages changes with time.

An error in the time reference of a message can be due to congestion of a circuit of the transmitter. For example, transmission of the message could be blocked for some time in the circuit performing the error-correcting encoding.

Another possible cause is a time delay induced by the transmission channel between the transmitter and the receiver.

To revert to an example previously referred to, a message indicating that a section of a railroad network is closed to traffic must have a precisely determined date. Thus in the case of a railroad radiocommunication system it is clear that messages must be dated because they relate to events that change with time.

The date a message is sent must therefore be included in the content of the message and possibly secured by the error-correcting mechanisms referred to hereinabove.

However this dating mechanism is inadequate if the transmitter and the receiver do not have a common clock. In radiocommunication networks including at least one mobile station it is impossible for the various stations to have a common clock.

The aim of the present invention is to propose a method of securing transmission of a message between two mobile stations or between a mobile station and a fixed station which alleviates the shortcomings of the prior art by diversifying the processes of transmitting the date to the receiver.

SUMMARY OF THE INVENTION

To be more precise, the present invention consists in a method of transmitting an initial message between two radiocommunication stations, possibly mobile stations, in which a first radiocommunication station:

- inserts a date supplied by a clock in said initial message to form an outgoing message, and
- transmits said outgoing message and the successive dates supplied by said clock to the second radiocommunication station.

The invention further consists in a transmitter for implementing the above method. To be more precise, it concerns a radiocommunication station, possibly a mobile station, including a clock, means for inserting dates supplied by said clock into initial messages to form outgoing messages, said dates being the dates of production of said outgoing messages, and means for transmitting said outgoing messages and successive dates supplied by said clock over said radiocommunication network.

Other aims and features of the present invention will become apparent on reading the following description of embodiments of the invention given with reference to the accompanying drawings.

BRIEF DESCRIPTION OF THE DRAWINGS

FIG. 1 shows a first embodiment of the invention.

FIG. 2 shows a second embodiment of the invention.

DETAILED DESCRIPTION OF THE PREFERRED EMBODIMENTS

FIG. 1 shows a first station $S_1$ including a transmit part E and a second station $S_2$ including a receive part R.

Each initial message $M_I$ to be transmitted to the second station is passed to message construction means C. The outgoing message M constructed by those means is made up of the initial message $M_I$ and the date or time supplied by a clock H.

The outgoing message M is constructed in a manner that is conventional in itself. It can be defined by $M=u(M_I, t)$ where t is the date or time supplied by the clock H. In the conventional way u is a function of the error-correcting encoding, as previously mentioned. How the message construction means C are implemented will be evident to the skilled person and is outside the scope of the present invention.

The transmitter E also includes multiplexing means (MUX) which alternate on the communication channel the dates supplied by the clock H and the outgoing messages M from the message construction means C.

The table below illustrates an extract of communication between the sender and the receiver showing the alternation of sending dates supplied by the clock H directly ($t_1$, $t_3$, $t_4$, $t_6$) and sending outgoing messages (containing the dates supplied by the clock H: $t_2$, $t_5$).

$$t_1$$
$$M_1 = u(M_{I1}, t_2)$$
$$t_3$$
$$t_4$$
$$M_2 = u(M_{I2}, t_5)$$
$$t_6$$
$$\ldots$$

FIG. 2 shows a second embodiment of the invention. This embodiment also includes a clock H and message construction means C.

The outgoing messages M are constructed by the means C from the initial messages $M_I$ and the dates supplied by the clock H, as described previously for the first embodiment.

However, unlike the first embodiment, there are no multiplexing means. To the contrary, the outgoing message M and the date supplied by the clock H are transmitted independently and in parallel to the receiver R of a second station $S_2$.

What is claimed is:

1. A method of transmitting an initial message between a first radiocommunication station and a second radiocommunication station, comprising:

inserting a first time supplied by a clock in the initial message to form an A) outgoing message, creating a B) successive second time with the clock, transmitting the A) outgoing message and the B) successive second time to the second radiocommunication station, and multiplexing the A) outgoing message containing the first time, and the B) successive second time by alternating on a communication channel the B) successive second time and the A) outgoing message, which are transmitted from the first radiocommunication station to the second radiocommunication station.

2. A radiocommunication station, including a clock, means for inserting a first time supplied by said clock into an initial message to form an A) outgoing message, said first time being the time of production of said outgoing message, said clock also being operative to create a B) successive second time, means for transmitting said A) outgoing message containing said first time and said B) successive second time supplied by said clock over said radiocommunication network, and means for multiplexing said A) outgoing message containing said first time and said B) successive second time, which are transmitted from said first radiocommunication station to said second radiocommunication station, such that said B) successive second time and said A) outgoing message are alternated on a communication channel.

3. A method of transmitting an initial message between a first radiocommunication station and a second radiocommunication station, comprising:

inserting a first time supplied by a clock in the initial message to form an outgoing message, creating a successive second time, transmitting the outgoing message containing said first time and the successive second time supplied by the clock, to the second radiocommunication station, and wherein the outgoing message and the successive time are transmitted, respectively, over the radiocommunication network in parallel on two different transmission channels.

4. A radiocommunication station, including a clock, which is operative to create a first time and a successive second time, means for inserting said first time supplied by said clock into an initial message to form an outgoing message, said first time being the time of production of said outgoing message, means for transmitting said outgoing message and said successive second time, over said radiocommunication network, and wherein said transmitter means transmits, respectively, said outgoing message and said successive second time in parallel on two different transmission channels.

* * * * *